Patented Aug. 18, 1953

2,649,454

UNITED STATES PATENT OFFICE 2,649,454

METHOD FOR PREPARING DIHYDROMORPHINONE, DIHYDROCODEINONE, AND DIHYDROPSEUDOCODEINONE

Henry Rapoport, Berkeley, Calif., assignor to The Regents of the University of California, Berkeley, Calif.

No Drawing. Application August 20, 1951, Serial No. 242,800

3 Claims. (Cl. 260—285)

This invention relates to the ketones dihydromorphinone, dihydrocodeinone and dihydropseudocodeinone which are used directly as analgesics and also are key intermediates in the syntheses of metopon and 6-methyldihydromorphine, two of the more promising morphine derivatives.

In general the object of this invention is the provision of a new method for producing these ketones whereby far greater yields can be obtained than by the use of methods presently available.

More particularly it is the object of my invention to provide a method of producing the ketones above mentioned by oxidizing the corresponding alcohol (dihydromorphine, dihydrocodeine and dihydroallopseudocodeine) in the presence of potassium tertiary-butoxide as a catalyst and wherein said catalyst has been preprepared in the container in which the required oxidation is to take place, this expedient being resorted to in order to avoid the introduction of water into the system.

Broadly this process involves three major steps; first the preparation of the catalyst, second the oxidation of the alcohol in the presence of said catalyst, and third the isolation or recovery of the resulting ketone.

Preparation of catalyst

The preparation of the potassium tertiary-butoxide is conveniently effected by adding potassium (4 g., 0.1 mole) to a mixture of dry tertiary-butyl alcohol (50 ml.) in dry benzene, toluene or xylene (150 ml.) in the vessel in which the oxidation of the alcohol is to be effected. After the potassium has completely reacted, the excess tertiary-butyl alcohol is removed as its benzene (or toluene or xylene) azeotrope, leaving the potassium tertiary butoxide as a clear solution in benzene.

Oxidation of alcohol

The air content of the vessel containing the catalyst is then displaced with an inert gas such as nitrogen to prevent any uncontrolled air-oxidation of the alcohol. This having been done 10 g. (0.033 mole) of dihydrocodeine and 60.1 g. (0.33 mole) of benzophenone, either as dry solids or as a benzene solution are added to the vessel and heated under reflux for a period of from 2 to 3 hours whereupon the alcohol is oxidized to the ketone dihydrocodeinone, and the benzophenone is reduced to benzhydrol. A shorter or longer heating period results in a decrease in yield and consequently should be avoided. In effecting this reaction the ratio of reagents is chosen to insure the maximum utilization of dihydrocodeine, the most expensive reagent. Thus from 3 to 5 moles of catalyst, potassium tertiary-butoxide, and 10 moles of the oxidant, benzophenone, were used per mole of dihydrocodeine.

Isolation of dihydrocodeinone

After thoroughly cooling the reaction mixture its dihydrocodeinone content can be recovered by adding 50 ml. of 3 N hydrochloric acid to the mixture. The benzene layer is then separated, extracted with three more 50 ml. portions of 3 N hydrochloric acid, and the combined aqueous extract successively washed with two 50 ml. portions of ether. After basifying the aqueous solution with concentrated sodium hydroxide, it is extracted with three 100 ml. portions of ethyl acetate or another immiscible organic solvent such as chloroform, and these extracts combined, dried over magnesium sulfate, and evaporated on a steam bath to about 25 ml. at which point appreciable crystalline material has separated from the hot solution. Upon cooling, this mother liquor yields about 8.3 g. (83%) of dihydrocodeinone having a melting point of 194–195°. This procedure of isolating the dihydrocodeinone is well known and consequently in and of itself involves no invention.

Dihydromorphinone

The oxidation of dihydromorphine to its corresponding ketone dihydromorphinone can be carried out by the same procedure as above described with respect to the oxidation of dihydrocodeine to dihydrocodeinone except for the following modifications: the molar ratio of potassium to alkaloid should be increased from 3:1 to 4.5:1, and the benzophenone and dihydromorphine should be added as solids rather than as a benzene solution due to the insolubility of the latter in benzene. The combined acid extract of the reaction mixture should be basified with concentrated aqueous ammonia, extracted exhaustively with ethyl acetate, and the ethyl acetate solutions dried and concentrated on a steam bath until solid material begins to precipitate. Cooling at this point followed by filtration yields the first crop of the ketone and an additional portion can be isolated by further concentration of the filtrate. By this procedure about 6.9 g. (71%) yield of dihydromorphinone can be obtained from 9.7 g. (0.034 mole) of dihydromorphine.

Dihydropseudocodeinone

Exactly the same procedure used for oxidizing dihydrocodeine as above described can be applied to the free base from 2.0 g. (0.0044 mole) of dihydroallopseudocodeine acid tartrate. The oily reaction product can be separated into alcoholic and non-alcoholic fractions by sublimation after esterifying with p-phenylbenzoylchloride in pyridine, and 0.55 g., 40% yield, of dihydropseudocodeinone, M. P. 93–110° can be obtained.

From the above description it will be seen that I have provided a new and far more effective method of preparing the three ketones in question from their corresponding alcohols and that by pre-preparing the required catalyst in the vessel in which the oxidation of the alcohol takes place, the presence of water which might otherwise be adsorbed by the catalyst is avoided.

I claim:

1. The method of preparing a ketone from an alcohol selected from the group consisting of dihydromorphine, dihydrocodeine and dihydroallopseudocodeine comprising: preparing a solution of potassium tertiary-butoxide in a vessel and then reacting one of said alcohols with benzophenone in said vessel in the presence of said tertiary-butoxide.

2. The method of preparing a ketone from an alcohol selected from the group consisting of dihydromorphine, dihydrocodeine and dihydroallopseudocodeine comprising: preparing a solution of potassium tertiary-butoxide in a vessel; displacing the air content of said vessel with an inert gas; and then reacting one of said alcohols with benzophenone in said vessel in the presence of said tertiary-butoxide.

3. The method of preparing a ketone from an alcohol selected from the group consisting of dihydromorphine, dihydrocodeine and dihydroallopseudocodeine comprising: preparing a solution of potassium tertiary-butoxide in a vessel, reacting one of said alcohols with benzophenone in said vessel in the presence of said tertiary-butoxide and then crystallizing from the reaction mixture the ketone corresponding to the alcohol used.

HENRY RAPOPORT.

References Cited in the file of this patent

UNITED STATES PATENTS

| Number | Name | Date |
|---|---|---|
| 2,379,832 | Serini et al. | July 3, 1945 |
| 2,384,335 | Oppenauer | Sept. 4, 1945 |

FOREIGN PATENTS

| Number | Country | Date |
|---|---|---|
| 415,097 | Germany | June 13, 1925 |

OTHER REFERENCES

Rapoport et al., J. Org. Chem., vol. 15, pp. 1103–1107 (September 1950).

Woodward et al., J. Am. Chem. Soc., vol. 67, pp. 1425–1429 (1945).